(12) United States Patent
Gao et al.

(10) Patent No.: US 9,021,916 B2
(45) Date of Patent: May 5, 2015

(54) ROBOTIC ARM

(71) Applicants:Shenzhen Futaihong Precision Industry Co., Ltd., Shenzhen (CN); FIH (Hong Kong) Limited, Kowlook (HK)

(72) Inventors: Jie Gao, Shenzhen (CN); Jian-Ping Jin, Shenzhen (CN); Bing Yu, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 14/076,416

(22) Filed: Nov. 11, 2013

(65) Prior Publication Data

US 2014/0251055 A1     Sep. 11, 2014

(30) Foreign Application Priority Data

Mar. 5, 2013    (CN) .......................... 2013 1 00691185

(51) Int. Cl.
    *B25J 17/00*     (2006.01)
    *B25J 17/02*     (2006.01)
    *B25J 18/00*     (2006.01)
    *B25J 9/00*      (2006.01)

(52) U.S. Cl.
    CPC ................ *B25J 18/00* (2013.01); *Y10S 901/23* (2013.01); *B25J 9/0051* (2013.01); *Y10S 901/15* (2013.01); *Y10S 901/18* (2013.01); *Y10S 901/28* (2013.01)

(58) Field of Classification Search
    CPC ........ B25J 18/00; B25J 17/00; B25J 17/0266; B25J 17/0275; B25J 17/0283
    USPC ......... 74/490.01, 490.03, 490.05; 901/15, 18, 901/23, 27, 28, 29
    See application file for complete search history.

(56) References Cited

U.S. PATENT DOCUMENTS

| | | | | |
|---|---|---|---|---|
| 5,333,514 | A * | 8/1994 | Toyama et al. | 74/490.06 |
| 6,419,211 | B1 * | 7/2002 | Hvittfeldt et al. | 267/69 |
| 6,722,842 | B1 * | 4/2004 | Sawdon et al. | 414/729 |
| 2006/0182602 | A1 * | 8/2006 | Schuler et al. | 414/735 |
| 2009/0211390 | A1 * | 8/2009 | Brogardh et al. | 74/490.03 |
| 2010/0037721 | A1 * | 2/2010 | Nakao et al. | 74/490.05 |
| 2010/0263471 | A1 * | 10/2010 | Weber | 74/490.06 |
| 2011/0097184 | A1 * | 4/2011 | Kinoshita et al. | 414/589 |
| 2011/0113918 | A1 * | 5/2011 | Zhao | 74/490.05 |
| 2011/0120254 | A1 * | 5/2011 | Zhang et al. | 74/490.04 |
| 2013/0205932 | A1 * | 8/2013 | Fukudome et al. | 74/490.01 |

* cited by examiner

*Primary Examiner* — William Kelleher
*Assistant Examiner* — Jake Cook
(74) *Attorney, Agent, or Firm* — Novak Druce Connolly Bove + Quigg LLP

(57) ABSTRACT

A robotic arm includes a driving unit, a first arm assembly connected to the driving unit, and a second arm assembly. The first arm includes two balls. The second arm assembly includes two arms and two intermediate members. Each intermediate member is secured to an end of one of the two arms. Each intermediate member defines a receiving recess. Each receiving recess has a spherical inner circumferential surface. Each ball is partially received in one of the two receiving recesses and abuts against the spherical inner circumferential surface. The two arms and the two intermediate members are capable of rotating about the balls. The driving unit drives the balls to move. The balls force the arms to move in a direction as a moving orientation of the balls, at the same time the arms rotating about the balls.

18 Claims, 3 Drawing Sheets

ROBOTIC ARM

BACKGROUND

1. Technical Field

The present disclosure generally relates to robots, particularly to a robotic arm for a robot.

2. Description of Related Art

Robots have replaced humans in performing repetitive and dangerous tasks, especially those in extreme environments or are unable to be done by humans do due to size limitations. Robots include several arms that are connected to each other by riveting, such that each of the arms is capable of moving relative to each other. However, the robots assembled in such manner are not always facile enough.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
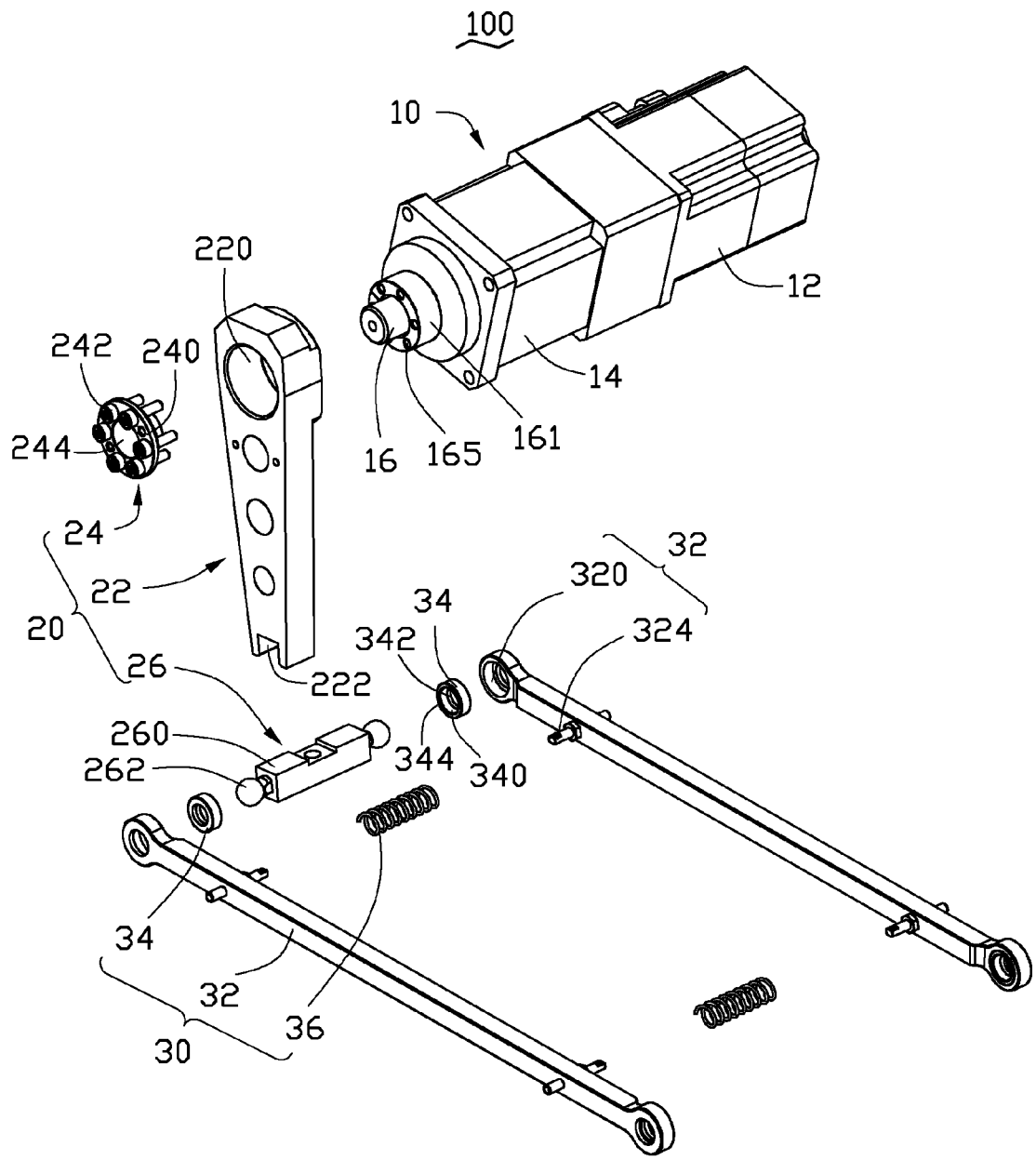
FIG. 1 is an exploded, isometric view of a robotic arm in accordance with an exemplary embodiment.
Figure 2:
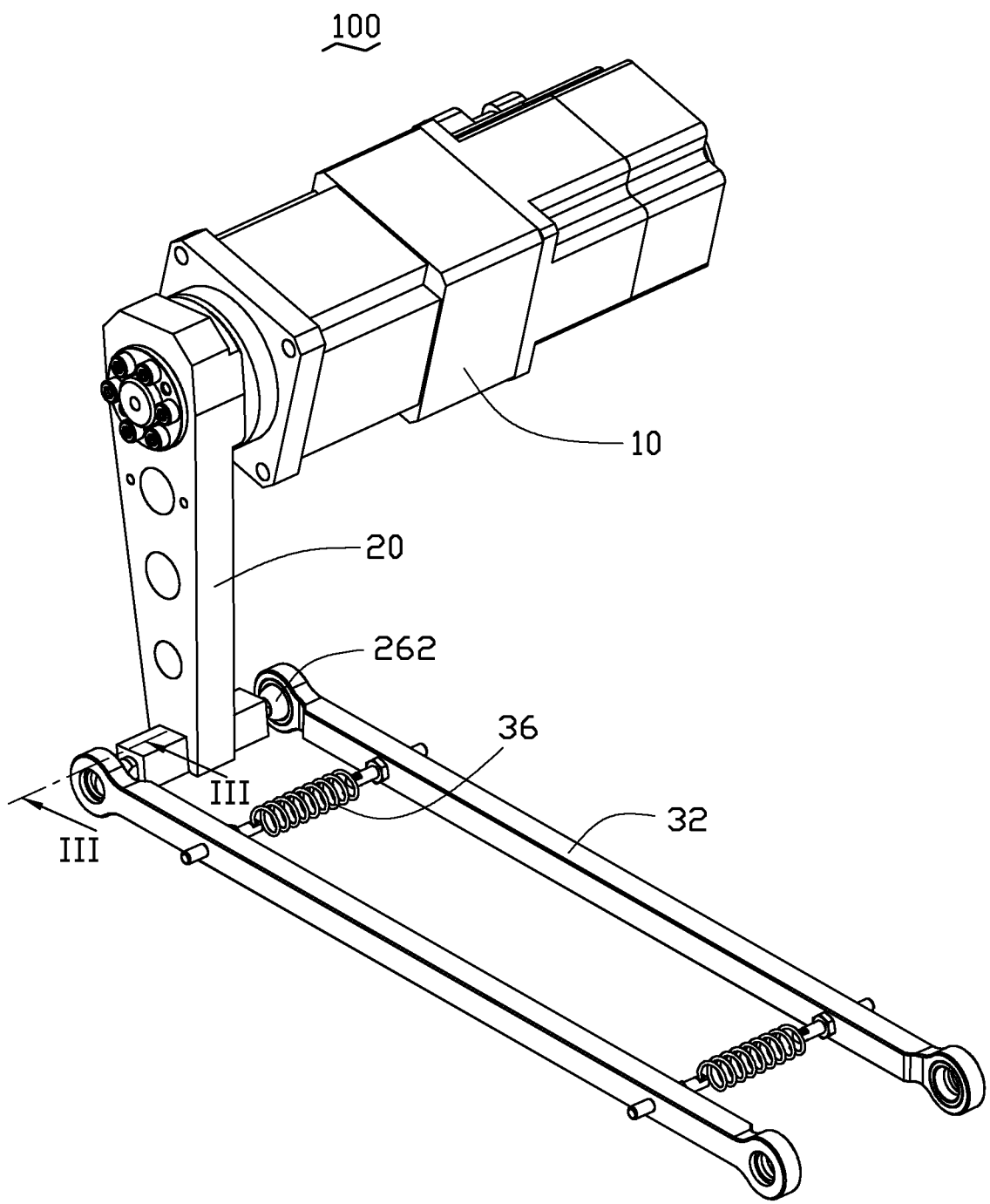
FIG. 2 is an assembled, isometric view of the robotic arm of FIG. 1.

FIGS. 1 and 2 show an exemplary embodiment of a robotic arm 100 used in a robot. The robotic arm 100 includes a driving unit 10, a first arm assembly 20 rotatably connected to the driving unit 10, and a second arm assembly 30.

The driving unit 10 includes a motor 12, a decelerator 14, and a shaft 16. The motor 12 drives the shaft 16 to rotate. The decelerator 14 decelerates and controls the shaft 16 to rotate at a desired speed slower than a speed of the motor 12. A shaft bushing 161 is coiled around and fixed to an end of the shaft 16. The shaft bushing 161 defines a plurality of threaded holes 165 in an end surface.

The first arm assembly 20 includes a rotating block 22, a fastening member 24, and a connecting member 26. The rotating block 22 is secured to the shaft 16 to be rotated by the shaft 16. In the exemplary embodiment, the rotating block 22 has a substantially rod shape. An end of the rotating block 22 defines a mounting hole 220. An opposite end of the rotating block 22 defines a notch 222. The shaft 16 and the shaft bushing 161 are inserted into the mounting hole 220. The fastening member 24 includes an annular plate 240 and a plurality of screws 242 threadedly secured to the annular plate 240. The annular plate 240 longitudinally defines a center hole 244. The annular plate 240 has an external diameter larger an internal diameter of the mounting hole 220. The annular plate 240 covers the mounting hole 220. As such, the shaft 16 is inserted through the center hole 244, and the screws 242 are inserted into the mounting hole 220 and are screwed into the threaded holes 165 of the shaft bushing 161, thereby fastening the rotating block 22 to the shaft 16 and enabling the rotating block 22 to be rotated by the shaft 16.

The connecting member 26 includes a post 260 and two balls 262 secured to two opposite ends of the posts 260. A substantially middle portion of the post 260 is secured in the notch 222 of the rotating block 22, thereby fixing the post 260 to the rotating block 22. When the rotating block 22 moves, the rotating block 22 drives the post 260 to move.

The second arm assembly 30 includes two arms 32 rotatably attached to the two balls 262, two intermediate members 34, and two elastic members 36.

Figure 3:
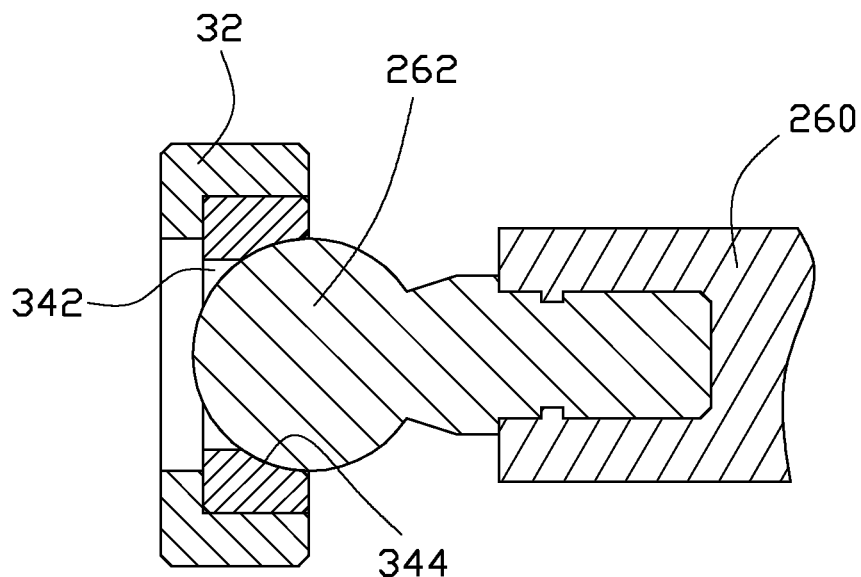
FIG. 3 is a cross-sectional view of FIG. 2 taken along line III-III.

In the exemplary embodiment, each arm 32 has a substantially bar shape. An end of each arm 32 defines a mounting recess 320 for receiving and securing one of the intermediate members 34. An opposite end of each arm 32 away from the mounting recess 320 may be connected to an operating mechanism (not shown) for holding or griping work-pieces. In the exemplary embodiment, each mounting recess 320 is substantially cylindrical. Each intermediate member 34 is substantially cylindrical. Each intermediate member 34 defines a receiving recess 340 in an end and defines a hole 342 in an opposite end. Each hole 342 communicates with the corresponding receiving recess 340. Each receiving recess 340 has a spherical inner circumferential surface 344 to be engaged with one of the balls 262. In this exemplary embodiment, each intermediate member 34 is made of copper. Each intermediate member 34 is received and secured in one of the mounting recesses 320, and each ball 262 is partially received in one of the receiving recesses 340 of the intermediate members 34 with an end portion extending into the corresponding hole 342 (best shown in FIG. 3), thereby clamping the intermediate member 34 between the corresponding arm 32 and the corresponding ball 262.

Each elastic member 36 can be an extension spring. The elastic members 36 are positioned between the two arms 32, and ends of each elastic member 36 are attached to the arms 32 to create an elasticity to force the spherical inner circumferential surfaces 344 of the intermediate members 34 to tightly abut against the balls 262, thereby assembling the arms 32 and the connecting member 26 together. The balls 262 are capable of rotating in the receiving recesses 340. As such, the arms 32 are capable of rotating about the balls 262. In this exemplary embodiment, two fixing members 324 are fixed on the arms 32, and ends of the elastic members 36 are attached to the fixing members 324. In other embodiments, the number of the elastic members can be one or more than two.

To assemble the robotic arm 100, the shaft 16 and the shaft bushing 161 are inserted into the mounting hole 220 of the rotating block 22. The screws 242 on the fastening member 24 are screwed into the threaded holes 165 of the shaft bushing 161 through the mounting hole 220, thereby fastening the rotating block 22 to the shaft 16 and enabling the rotating block 22 to be rotated by the shaft 16. Then, a substantially middle portion of the post 260 is secured in the notch 222 of the rotating block 22. The two intermediate members 34 are secured in the mounting recesses 320 of the two arms 32. The two balls 262 are aligned with the receiving recesses 340. The elastic members 36 are then connected to the two arms 32, enabling the spherical inner circumferential surfaces 344 of the intermediate members 34 to tightly abut against the balls 262, thereby assembling the arms 32 and the connecting member 26 together.

In use, the driving unit 10 drives the first arm assembly 20 to rotate about a shaft 16. When the balls 262 move relative to the intermediate members 34, a frictional force is created between the balls 262 and the intermediate members 34. The frictional force forces the arms 32 of the second arm assembly 30 to move with the balls 262. That is, the friction force forces the arms 32 to rotate about the shaft 16. At the same time, the arms 32 rotate about the balls 262, enlarging a moving sphere of the robotic arm 100. The elastic members 36 enable the intermediate members 34 to always abut against the balls 262 during a motion.

It is understood that the two balls 262 may be other universal joints to make the two arms 32 move with the rotating block 26 and simultaneously rotate about the universal joint.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A robotic arm, comprising:
a driving unit, the driving unit including a shaft; P1 a first arm assembly connected to the driving unit, the first arm assembly comprising two balls, a rotating block, a fastening member and a shaft bushing coiled around and fixed to an end of the shaft, the fastening member including an annular plate and a plurality of screws threadedly secured to the annular plate, the shaft bushing defining a plurality of threaded holes in an end surface, the rotating block defining a mounting hole in an end, the plurality of screws being inserted into the mounting hole and screwed into the threaded holes, thereby fastening the rotating block to the shaft; and
a second arm assembly comprising two arms and two intermediate members, each intermediate member secured to an end of one of the two arms, each intermediate member defining a receiving recess, each receiving recess having a spherical inner circumferential surface, each ball partially received in one of the two receiving recesses and abutting against the spherical inner circumferential surface, the two arms and the two intermediate members capable of rotating about the balls, the driving unit driving the balls to move, the balls forcing the arms to move in a direction same as a moving orientation of the balls and the arms simultaneously rotating about the balls.

2. The robotic arm as claimed in claim 1, wherein the second arm assembly further comprises at least one elastic member; the at least one elastic member is connected to the two arms to force the spherical inner circumferential surfaces of the intermediate members to tightly abut against the balls.

3. The robotic arm as claimed in claim 2, wherein the at least one elastic member is an extension spring.

4. The robotic arm as claimed in claim 2, wherein the first arm assembly further comprises a connecting member; the connecting member comprises a post; and
the two balls are secured to two opposite ends of the post.

5. The robotic arm as claimed in claim 4, wherein the post is secured to the rotating block; the rotating block is connected to the driving unit and driven by the driving unit to move; and the rotating block drives the connecting member to move.

6. The robotic arm as claimed in claim 1, wherein the driving unit comprises a motor and a decelerator; the rotating block is connected to the shaft; the motor drives the shaft to rotate; the decelerator decelerates and controls the shaft to rotate at a desired speed slower than a speed of the motor.

7. The robotic arm as claimed in claim 1, wherein each of the two intermediate members defines one of the two receiving recesses in an end and defines a hole in an opposite end; each hole communicates with the corresponding receiving recess; and an end portion of each of the two balls extends into the corresponding hole.

8. The robotic arm as claimed in claim 1, wherein each of the two arms defines a mounting recess in an end; each of the two intermediate members is secured in one of the mounting recesses.

9. A robotic arm, comprising:
a driving unit, the driving unit including a shaft;
a first arm assembly connected to the driving unit, the first arm assembly comprising at least one universal joint, a rotating block, a fastening member and a shaft bushing coiled around and fixed to an end of the shaft, the fastening member including an annular plate and a plurality of screws threadedly secured to the annular plate, the shaft bushing defining a plurality of threaded holes in an end surface, the rotating block defining a mounting hole in an end, the plurality of screws being inserted into the mounting hole and screwed into the threaded holes, thereby fastening the rotating block to the shaft; and
a second arm assembly, the second arm assembly defining at least one receiving recess, the at least one universal joint partially and tightly received in the at least one receiving recess, the second arm assembly capable of rotating about the at least one universal joint, the driving unit driving the first arm assembly to move to make the at least one universal joint force the second arm assembly to move in a direction same as a moving orientation of the universal joint and the second arm assembly simultaneously rotating about the universal joint.

10. The robotic arm as claimed in claim 9, wherein the second arm assembly comprises two arms and two intermediate members, each intermediate member is secured to an end of one of the two arms; each intermediate member defines one of the at least one receiving recess; each receiving recess has a spherical inner circumferential surface; each universal joint is partially received in one of the two receiving recesses and abutting against the spherical inner circumferential surface.

11. The robotic arm as claimed in claim 10, wherein each of the at least one universal joint is a ball.

12. The robotic arm as claimed in claim 11, wherein the second arm assembly further comprises at least one elastic member; the at least one elastic member is connected to the two arms to force the spherical inner circumferential surfaces of the intermediate members to tightly abut against the balls.

13. The robotic arm as claimed in claim 12, wherein the at least one elastic member is an extension spring.

14. The robotic arm as claimed in claim 12, wherein the first arm assembly further comprises a connecting member; the connecting member comprises a post; and the two balls are secured to two opposite ends of the post.

15. The robotic arm as claimed in claim 14, wherein the post is secured to the rotating block; the rotating block is connected to the driving unit and driven by the driving unit to move; and the rotating block drives the connecting member to move.

16. The robotic arm as claimed in claim 9, wherein the driving unit comprises a motor and a decelerator; the rotating block is connected to the shaft; the motor drives the shaft to rotate; the decelerator decelerates and controls the shaft to rotate at a desired speed slower than a speed of the motor.

17. The robotic arm as claimed in claim 11, wherein each of the two intermediate members defines one of the two receiving recesses in an end and defines a hole in an opposite end;

each hole communicates with the corresponding receiving recess; and an end portion of each of the two balls extends into the corresponding hole.

18. The robotic arm as claimed in claim 11, wherein each of the two arms defines a mounting recess in an end; each of the two intermediate members is secured in one of the mounting recesses.

\* \* \* \* \*